Patented Oct. 22, 1929

1,732,795

UNITED STATES PATENT OFFICE

RAY P. DINSMORE, OF AKRON, OHIO, ASSIGNOR TO THE GOODYEAR TIRE & RUBBER COMPANY, OF AKRON, OHIO, A CORPORATION OF OHIO

SYNTHETIC RUBBER AND METHOD OF MAKING IT

No Drawing.     Application filed September 13, 1927. Serial No. 219,368.

My invention relates to a process for polymerizing unsaturated hydrocarbons to produce a synthetic rubber and it has, for its primary object, the provision of a synthetic rubber having the structure and physical properties of natural rubber.

More specifically, my invention has for one of its objects the provision of a synthetic rubber which is composed of minute globules similar to those of which natural rubber is composed.

When natural rubber is subjected to prolonged milling its tensile strength and elasticity are greatly reduced. This phenomenon is presumed to be due to the breaking up and the agglomeration of the globules of which rubber is composed.

Synthetic rubber is manufactured by polymerizing simple unsaturated butadiene hydrocarbons, such as isoprene and methyl butadiene. Synthetic rubber, when manufactured by the usual processes, has proven to be unsatisfactory for many purposes, for the reason that it lacks toughness and elasticity and it is presumed that these defects are due to the fact that the polymerized hydrocarbon, like the overly milled natural rubber, does not have a definite globular structure.

I have made the discovery that by treating the basic unsaturated hydrocarbon from which the rubber is to be produced, with an emulsifying agent so as to break up the hydrocarbon into definite globules, a product much superior to any synthetic rubber heretofore produced is obtained.

The production of synthetic rubber from isoprene may be effected by treating this material with a suitable emulsifying agent and a protective colloid adapted to stabilize the emulsion formed according to the following method. To 30 cc. of isoprene add in small quantities 30 cc. of water containing approximately 10 drops of the emulsifying agent; such as oleic acid, and sufficient ammonia to form a soap. Agitate these materials vigorously for a short time and then add 15 cc. of a two percent solution of casein in small quantities from time to time and keep the mixture cool by frequent immersion in ice water. After all of the casein has been added, the caoutchouc is sealed and placed in an oven which is maintained at a temperature of substantially 50° C. After remaining in the oven for a period of about two months, the isoprene begins to thicken and at the end of six months it will have become quite viscous. When the viscous substance is treated with acetone a rubber-like mass separates out and this mass may be milled and vulcanized by means of sulfur and a suitable accelerator.

The following method may be employed in order to obtain a product from dimethyl butadiene having much the same characteristics as natural rubber. Take 30 cc. of the hydrocarbon and emulsify it in 30 cc. of water containing 10 drops of oleic acid neutralized with potassium hydroxide. To this solution add 15 cc. of two percent solution of egg albumin. Seal the mixture in a tube and maintain it at a temperature of about 50° to 70° C. for a period of six months. The material may then be removed, coagulated with alcohol, and dried in a vacuum. The product obtained is tough, elastic and may be cured by means of sulphur and a suitable accelerator of vulcanization in a manner similar to that employed to cure the natural product.

It is supposed that the hydrocarbon polymerized by my method consists of small globules which are surrounded by outer casings or shells of the protective colloid and the globular structure of the hydrocarbon is thus permanently maintained. The protein, coming into contact with the outer surface of the globules, acts as a catalyst and causes polymerization to take place in the outer films of the hydrocarbon, while the inner portions of the globules, not being so strongly affected by the catalytic agency, remain in a more or less liquid state, and thus preserve the elasticity and toughness of the finished product.

Although I have advanced certain theories to explain the behavior of the hydrocarbons from which the rubber is obtained, when treated with the emulsifying and polymerizing materials, it is evident that the beneficial results realized by employing the method which I have outlined are not dependent upon the correctness of such theories. It will, of course, be understood that the validity of any patents which may be obtained upon the method that I have disclosed should not be affected by such theories.

Although I have disclosed only the preferred embodiments of my invention and described those embodiments in detail, it will be apparent to those skilled in the art that it is not so limited, but that various minor modifications may be made therein without departing from the spirit of my invention or from the scope of the appended claims.

What I claim is:

1. A method of producing synthetic rubber from an unsaturated hydrocarbon adapted to be polymerized to form rubber which comprises treating the hydrocarbon with an emulsifying ingredient and a protein.

2. A method of producing synthetic rubber which comprises treating an unsaturated hydrocarbon adapted to be polymerized to produce rubber with an emulsifying agent and casein, and subsequently allowing the materials to stand until polymerization takes place.

3. A method of producing synthetic rubber from unsaturated hydrocarbon adapted to be polymerized to produce rubber which comprises treating the hydrocarbon with an oleic acid soap, and a protective colloid containing a protein, and allowing the materials to stand at a temperature of 50 to 70° C., until polymerization takes place.

4. A method of producing synthetic rubber which comprises treating an aqueous suspension of a butadiene hydrocarbon adapted to be polymerized to produce artificial rubber with an ammonium salt of oleic acid and a protein, and allowing the materials to stand at a temperature of from 50 to 70° C. until polymerization takes place.

5. A method of producing synthetic rubber which comprises treating an unsaturated hyrocarbon adapted to be polymerized to produce rubber with an ammonium salt of oleic acid and a protein and allowing the material to stand at a temperature of from 50 to 70° C. until polymerization takes place.

6. An artificial rubber that has been produced by the action of a protein upon an aqueous suspension of a butadiene hydrocarbon and a soap at a temperature of 50° to 70° C.

7. A method of treating butadiene hydrocarbon which comprises adding oleic acid thereto and subsequently introducing alkali into the mixture, thereby forming an emulsion of the hydrocarbon and a soap.

8. A method of treating butadiene hydrocarbons which comprises adding oleic acid thereto and subsequently introducing ammonia into the mixture to form a soap.

In witness whereof, I have hereunto signed my name.

Signed at Akron, in the county of Summit, and State of Ohio, this 12th day of September, 1927.

RAY P. DINSMORE.